(12) United States Patent
Hwang et al.

(10) Patent No.: US 7,255,980 B2
(45) Date of Patent: Aug. 14, 2007

(54) BLACK MATRIX, METHOD FOR PREPARING THE SAME, AND FLAT PANEL DISPLAY AND ELECTROMAGNETIC INTERFERENCE FILTER USING THE SAME

(75) Inventors: Euk Che Hwang, Osan-si (KR); Chang Ho Noh, Suwon-si (KR); Jin Young Kim, Suwon-si (KR); Ki Yong Song, Seoul (KR); Sung Hen Cho, Seoul (KR)

(73) Assignee: Samsung Corning Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/270,545

(22) Filed: Nov. 10, 2005

(65) Prior Publication Data

US 2006/0105251 A1  May 18, 2006

(30) Foreign Application Priority Data

Nov. 12, 2004 (KR) ............ 10-2004-0092468

(51) Int. Cl.
*G02B 5/20* (2006.01)
(52) U.S. Cl. ............... 430/321; 430/7; 174/388; 174/392; 427/164; 205/122; 205/187
(58) Field of Classification Search ............ None
See application file for complete search history.

(56) References Cited

U.S. PATENT DOCUMENTS

| | | |
|---|---|---|
| 4,822,718 A | 4/1989 | Latham et al. |
| 5,176,971 A | 1/1993 | Shimamura et al. |
| 5,378,274 A | 1/1995 | Yokoyama et al. |
| 5,587,818 A | 12/1996 | Lee |
| 5,592,317 A | 1/1997 | Fujikawa et al. |
| 5,626,796 A | 5/1997 | Tsujimura et al. |
| 5,639,579 A | 6/1997 | Hayashi et al. |
| 5,714,286 A | 2/1998 | Uchikawa et al. |
| 5,866,298 A | 2/1999 | Iwamoto et al. |
| 6,255,025 B1 * | 7/2001 | Akutsu et al. ........... 430/7 |

(Continued)

FOREIGN PATENT DOCUMENTS

JP     8-034923 A     2/1996

(Continued)

*Primary Examiner*—John A. McPherson
(74) *Attorney, Agent, or Firm*—Buchanan Ingersoll & Rooney PC

(57) ABSTRACT

A black matrix, a method for preparing the black matrix, a flat panel display and an electromagnetic interference filter using the black matrix. The black matrix may comprise a substrate, a titanium oxide layer, a Ni plating layer, and a Ni/Pd alloy layer. The method may comprise the steps of forming a titanium oxide layer, forming a metal particle-deposited pattern on the titanium oxide layer, forming a Ni electroless plating layer on the metal particle-deposited pattern, and forming a Ni/Pd alloy layer on the Ni electroless plating layer. Since the black matrix may have a high blackening density via simple selective multilayer plating without using a high-price vacuum sputtering apparatus and undergoing photolithography, unlike conventional chromium-based black matrices, it may be employed in various flat panel displays. In addition, since the black matrix may exhibit superior electrical conductivity, it may be used in electromagnetic interference filters without additional front-surface blackening.

17 Claims, 2 Drawing Sheets

U.S. PATENT DOCUMENTS

2005/0003242 A1* 1/2005 No et al. .................... 428/701
2005/0202599 A1  9/2005 Noh et al.
2006/0019182 A1* 1/2006 Lee et al. ..................... 430/7
2006/0097622 A1  5/2006 Noh et al.

FOREIGN PATENT DOCUMENTS

| JP | 11-143056 A | 5/1999 |
|---|---|---|
| JP | 11-326606 A | 11/1999 |
| JP | 11-352310 A | 12/1999 |
| JP | 2000-147240 A | 5/2000 |

* cited by examiner

BLACK MATRIX, METHOD FOR PREPARING THE SAME, AND FLAT PANEL DISPLAY AND ELECTROMAGNETIC INTERFERENCE FILTER USING THE SAME

BACKGROUND OF THE INVENTION

This non-provisional application claims priority under 35 U.S.C. § 119(a) on Korean Patent Application No. 2004-92468 filed on Nov. 12, 2004, which is herein incorporated by reference.

1. Field of the Invention

Embodiments of the present invention relate to a novel black matrix, a method for preparing the black matrix, and a flat panel display and an electromagnetic interference filter comprising the black matrix. More specifically, embodiments of the present invention relate to a black matrix comprising a substrate, a titanium oxide layer, a Ni plating layer and a Ni/Pd alloy layer; a method for preparing the black matrix; and a flat panel display and an electromagnetic interference filter comprising a black matrix with high blackening density and superior electrical conductivity prepared by the method.

2. Description of the Related Art

Black matrices called "light-blocking films" are currently applied to all display devices to prevent color mixing between red (R), green (G) and blue (B) colors and to improve the image contrast. To prevent deterioration of visibility, black matrices are combined with color filters in liquid crystal displays, are interposed between RGB pixels in luminescent devices, such as fluorescent displays and phosphorescent displays, and are formed by additionally blackening copper wires of electromagnetic interference filters in plasma displays.

Most black matrices developed hitherto are prepared by pattering metal films, e.g., chromium films, by photolithography. In this connection, for example, U.S. Pat. No. 5,378,274 (Yokoyama et al.), U.S. Pat. No. 5,587,818 (S. Lee et al.), and U.S. Pat. No. 5,592,317 (Fujikawa et al.) disclose methods for preparing a black matrix by vacuum-depositing chromium within a display screen to form a light-absorption coating layer and pattering the coating layer by photolithography. These methods, however, entail considerable preparation costs. Further, black matrices prepared by the methods have a high reflectance, and color filters combined with the black matrices have a high light reflectance, causing poor visibility of images.

To solve this problem, there have been proposed various methods for achieving low reflectance characteristics by forming a chromium film between oxide films, such as chromium oxide films. The advantages of black matrices prepared by these methods include high visible light absorption rate, small film thickness, and high optical density. However, the metal chromium may be converted to the chromium (VI) species and the use of heavy metals containing oxidation factors, such as ammonium-cerium (IV), is required, which poses health and environmental hazards.

Thus, there is a strong need in some industrial fields to replace chromium-based materials with organic black matrix coating materials because of the typical advantages of lower price as compared to the chromium-based materials, substantially reduced threat to the environment, and greater ease of pattern formation.

Extensive research and development have been conducted on organic black matrix materials for the past decade. U.S. Pat. No. 4,822,718 (Latharn et al.) and U.S. Pat. No. 5,176,971 (Shimamura et al.) disclose dyed black matrix compositions comprising a polyimide precursor binder. However, these compositions have the problems of short storage life, relatively low optical density after deposition, poor heat stability and fading resistance, and the like. In addition, the "dye-based" compositions tend to dye leachate during subsequent processing steps. Further, since the coating materials do not serve to substantially create photoimages, an additional photoresist layer is necessary to form a pattern.

For achieving higher optical density, improved heat stability and superior fading resistance and resistance to chemical attack, pigment-dispersed (distinguished from "dye-based") black matrix coating systems have been developed. No pigment-dispersed coating compositions satisfy the requirements on black matrix systems having high electrical resistance, small film thickness and high optical density.

Japanese Patent Laid-open No. Hei 8-34923 (Sekisui Chemical Industries, Ltd.) describes a two-step method for preparing a black matrix by coating a substrate with a composition comprising a photosensitive polymer and a black dye to form a black-colored layer, exposing the layer to light through a mask to form a desired pattern, and colorizing the pattern with a black dye. However, this method is too complicated to be put to practical use.

On the other hand, when organic materials constituting black matrices are frequently exposed to light, display quality is deteriorated and improvement in shelf life is required. Compositions with improved shelf life are described in, e.g., U.S. Pat. No. 5,626,796 (Tsujimura et al.), U.S. Pat. No. 5,639,579 (Hayashi et al.), U.S. Pat. No. 5,714,286 (Uchikawa et al.) and U.S. Pat. No. 5,866,298, and Japanese Patent Laid-open Nos. 2000-147240, Hei 11-143056 and Hei 11-326606. The compositions with improved shelf life described in the patent literature have a problem in that they cannot exhibit high optical density comparable to chromium black matrix systems. The reason is that since resin black matrices have a lower absorption coefficient than metal black matrices, they must have a large film thickness to reach specified optical density. From the large film thickness arises the problem of step height in the subsequent processing, thus deteriorating the driving characteristics of the entire display device.

On the other hand, Japanese Patent Laid-open No. Hei 11-352310 discloses a technique for preparing a black matrix using Ni and $NiO_x$. This technique is environmentally friendly, but requires the use of a different type of vacuum apparatus from conventional vacuum sputtering apparatuses in the formation of a Ni film. In addition, the technique suffers from a difficulty in determining uniform etching conditions.

OBJECTS AND SUMMARY

The present inventors have earnestly and intensively conducted research to solve the above-mentioned problems of the prior art. As a result, the present inventors have found that a low-reflectance black matrix pattern may be formed in a simple manner by forming a photoreactive film comprising a compound whose reactivity is changed by light, i.e. a photoreactive compound, with a predetermined thickness, selectively exposing the photoreactive film to light to form a latent pattern acting as a nucleus for crystal growth via photoreaction, and plating the latent pattern with a desired metal to grow metal crystals on the latent pattern. Embodiments of the present invention have been achieved based on this finding.

Therefore, it is one object of embodiments of the present invention to provide a black matrix that exhibits superior adhesion to a substrate, is readily formed with a high-resolution pattern, and has good absorption effects of externally incident light.

It is another object of embodiments of the present invention to provide a method for preparing the black matrix at low costs without the use of a high-price vacuum deposition apparatus and involving metal removal using a photoresist.

It is another object of embodiments of the present invention to provide a flat panel display with improved luminance and contrast characteristics comprising the black matrix.

It is yet another object of embodiments of the present invention to provide an electromagnetic interference filter with superior electromagnetic interference performance comprising the black matrix.

In accordance with one aspect of embodiments of the present invention for achieving the above objects, there may be provided a black matrix comprising (i) a substrate, (ii) a titanium oxide layer, (iii) a Ni plating layer, and (iv) a Ni/Pd alloy layer.

In accordance with another aspect of embodiments of the present invention, there may be provided a method for preparing a black matrix, comprising the steps of: (i) forming a titanium oxide layer on a substrate; (ii) forming a metal particle-deposited pattern on the titanium oxide layer; (iii) forming a Ni electroless plating layer on the metal particle-deposited pattern; and (iv) forming a Ni/Pd alloy layer on the Ni electroless plating layer.

In accordance with another aspect of embodiments of the present invention, there may be provided a flat panel display comprising the black matrix.

In accordance with still another aspect of embodiments of the present invention, there may be provided an electromagnetic interference filter comprising the black matrix.

BRIEF DESCRIPTION OF THE DRAWINGS

The above and other objects, features and other advantages of embodiments of the present invention will be more clearly understood from the following detailed description taken in conjunction with the accompanying drawings, in which.

DETAILED DESCRIPTION OF THE PREFERRED EMBODIMENTS

Hereinafter, embodiments of the present invention will be explained in more detail with reference to the accompanying drawings.

Figure 1A:
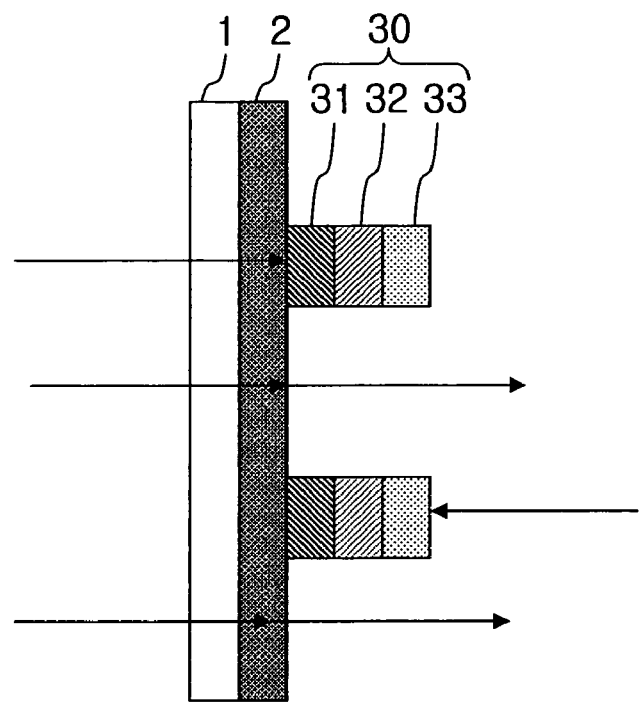
FIG. 1a is a diagram illustrating the state wherein light incident on the front surface and light incident on the back surface of a black matrix according to one embodiment of the present invention are not transmitted through the black matrix due to high extinction coefficient of a plurality of plating layers.

As shown in FIG. 1a, a black matrix of an embodiment of the present invention comprises a substrate 1, a titanium oxide layer 2 and a plurality of plating layers 30. The titanium oxide layer 2 may be an amorphous $TiO_2$ layer, i.e. $TiO_x$ layer (0<x<2). The plurality of plating layers may comprise a Ni plating layer 31, a Ni/Pd alloy layer 32, and optionally a plating layer 33 of a highly conductive metal, such as Cu, Ni, Ag or Au.

For reference, the term "Ni/Pd alloy layer" as used throughout the specification is intended to refer to an alloy region of Ni and Pd, which is formed by substitution between Ni constituting the Ni electroless plating layer and Pd present in a Pd metal salt solution.

FIG. 1a shows the principle that a multilayer thin film of an embodiment of the present invention comprising a titanium oxide layer 2 and a plurality of plating layers 30 acts as a black matrix.

As is evident from FIG. 1a, light incident on the front surface and light incident on the back surface of the substrate are not transmitted through the multilayer plating layer 30 due to high extinction coefficient (k) of the multilayer plating layer.

Figure 1B:
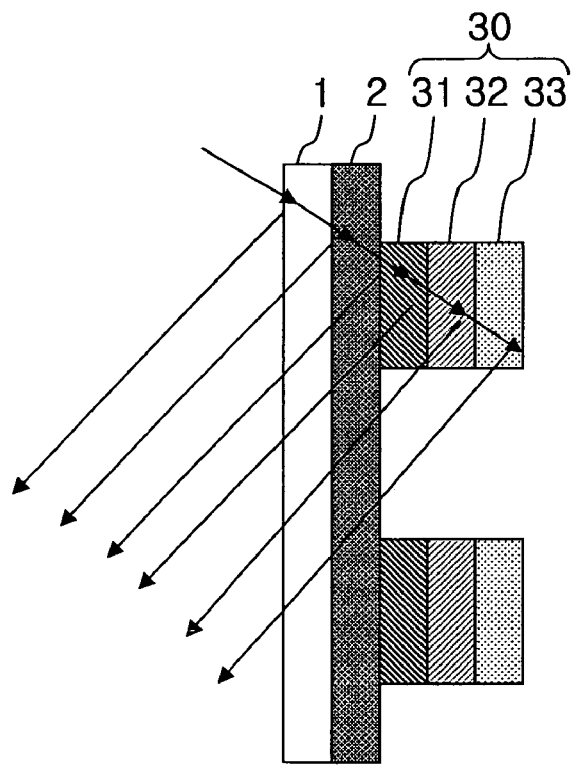
FIG. 1b is a diagram illustrating the state wherein light incident on the front surface of a black matrix according to one embodiment of the present invention is reflected from the interfaces between respective constituent layers of the black matrix having different refractive indices, and the reflected light waves undergo constructive and destructive interference to determine a front-surface reflectance.

On the other hand, FIG. 1b shows the principle of low front-surface reflectance allowing a multilayer thin film of an embodiment of the present invention to serve as a black matrix. As shown in FIG. 1b, light incident on the surface of the substrate 1 is reflected from the respective layers, e.g., the substrate 1, the titanium oxide layer 2, the Ni electroless plating layer 31, the Ni/Pd alloy layer 32, and the plating layer 33 of a highly conductive metal, such as Cu, Ni, Ag or Au, with different optical values. The final front-surface reflectance is determined by constructive and destructive interference of the light waves reflected from the front surfaces of the respective layers. The degree of constructive and destructive interference of the light waves reflected from the front surfaces of the respective layers is determined by a phase difference of the light waves associated with the refractive index (n) and physical thickness of the respective layers. Accordingly, the low front-surface reflectance may be achieved by appropriately controlling the refractive index and physical thickness of the respective layers.

A black matrix of embodiments of the present invention may be prepared in accordance with the following procedure. First, a photoreactive compound may be coated on a substrate 1 to form a titanium oxide layer 2. Then, a water-soluble polymeric compound is coated on the titanium oxide layer 2 to form a water-soluble polymer layer. Subsequently, the water-soluble polymer layer may be selectively exposed to light to form a latent pattern acting as a nucleus for crystal growth. The latent pattern may be treated with a metal salt solution to form a metal particle-deposited pattern. Thereafter, a Ni electroless plating layer 31 may be formed on the metal particle-deposited pattern, and then a Ni/Pd alloy layer 32 may be formed on the Ni electroless plating layer 31 to prepare the final black matrix. The black matrix of embodiments of the present invention may further comprise a plating layer 33 of a highly conductive metal, such as Cu, Ni, Ag or Au, which is formed on the Ni/Pd alloy layer 32.

Hereinafter, a method of an embodiment of the present invention will be explained in more detail, based on the respective steps, with reference to FIG. 2.

Figure 2:
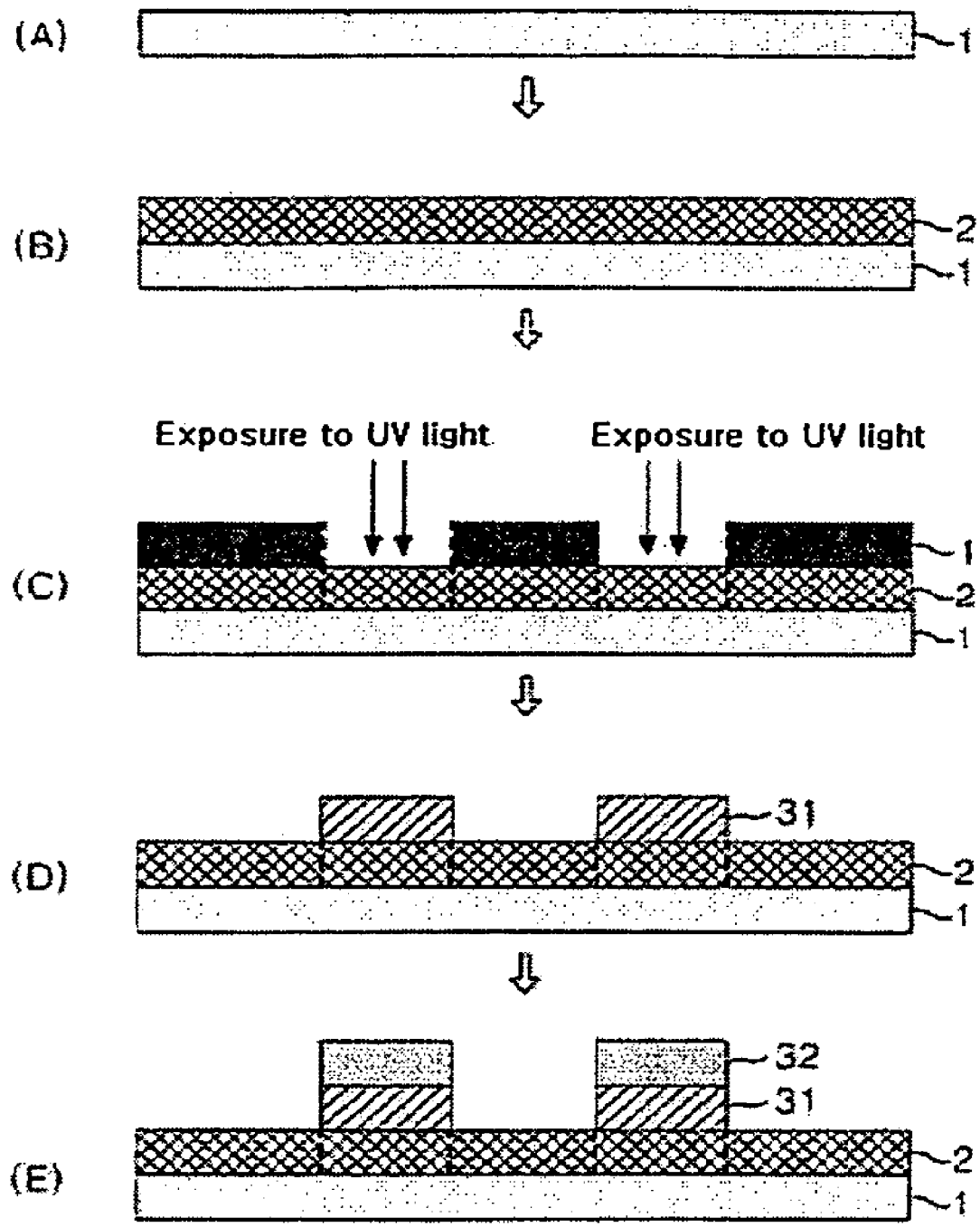
FIG. 2 shows cross-sectional views illustrating the procedure of a method for preparing a black matrix according to one embodiment of the present invention.

In step (i), a photoreactive compound is coated on a substrate 1 to form a transparent amorphous titanium oxide layer 2 ((B) in FIG. 2).

Examples of preferred substrates that may be used in embodiments of the present invention include, but are not especially limited to, transparent plastic substrates and glass materials. Examples of transparent plastic substrates include, but are not limited to, acrylic resins, polyesters, polycarbonates, polyethylenes, polyethersulfones, olefin-maleimide copolymers, norbornene-based resins, and the like. In the case where excellent heat resistance is required, olefin-maleimide copolymers and norbornene-based resins are preferred. Otherwise, it is preferred to use polyester films, acrylic resins, and the like.

The term "photoreactive compound" as used herein refers to a compound whose characteristics are changed by light. For example, the photoreactive compound may be inactive when not exposed to light, but its reactivity is accelerated upon exposure to light, e.g., UV light. When the photoreactive compound is exposed to UV light, electron excitation occurs in the exposed portion, thus exhibiting activity, e.g., reducibility. Accordingly, reduction of metal ions in the exposed portion takes place to provide a negative pattern.

Examples of suitable photoreactive compounds include, but are not limited to, Ti-containing organometallic compounds which can form transparent amorphous $TiO_2$, i.e. $TiO_x$ $(0<x<2)$. Examples of suitable Ti-containing organometallic compounds include, but are not limited to, tetraisopropyl titanate, tetra-n-butyl titanate, tetrakis(2-ethylhexyl) titanate, and polybutyl titanate.

The photoreactive compound may be dissolved in an appropriate solvent, e.g., isopropyl alcohol, and then the solution may be coated on the substrate 1 by spin coating, spray coating, screen printing, or the like. After coating, the coating layer may be heated on a hot plate or in a convection oven at a temperature preferably not higher than 200° C. for preferably not more than 20 minutes to form a photoreactive film. Heating to a temperature exceeding 200° C. may lead to formation of a crystalline $TiO_2$ layer, unfavorably resulting in poor optical properties.

In step (ii), a metal particle-deposited pattern is formed on the titanium oxide layer 2.

More specifically, step (ii) may include the sub-steps of: (a) coating a water-soluble polymeric compound on the titanium oxide layer to form a water-soluble polymer layer; (b) selectively exposing the water-soluble polymer layer to light to form a latent pattern acting as a nucleus for crystal growth; and (c) treating the latent pattern with a metal salt solution to form the metal particle-deposited pattern.

In sub-step (a), a water-soluble polymeric compound may be coated on the titanium oxide layer 2 formed in step (i) to form a water-soluble polymer layer.

Examples of the water-soluble polymeric compound used herein include, but are not limited to homopolymers, such as polyvinylalcohols, polyvinylphenols, polyvinylpyrrolidones, polyacrylic acids, polyacrylamides, gelatins, etc., and copolymers thereof.

2-30% by weight of the water-soluble polymeric compound may be dissolved in water, and the resulting solution may be coated on the photoreactive film, followed by heating, to form a water-soluble polymer layer.

The water-soluble polymer layer thus formed may play a roll in promoting photoreduction upon exposure to UV light, thus acting to improve the photocatalytic activity.

Preferably, a photosensitizer is added during the formation of the water-soluble polymer layer in sub-step (a) to increase the photosensitivity of the water-soluble polymer layer. Example of the photosensitizer include, but are not limited to, a water-soluble compound selected from colorants, organic acids, organic acid salts, and organic amines. Specific examples of the photosensitizer include, but are not limited to, tar colorants, potassium and sodium salts of chlorophylline, riboflavin and derivatives thereof, water-soluble annatto, $CuSO_4$, caramel, curcumine, cochinal, citric acid, ammonium citrate, sodium citrate, oxalic acid, potassium tartarate, sodium tartarate, ascorbic acid, formic acid, triethanolamine, monoethanolamine, and malic acid.

The amount of the photosensitizer added may be in the range of 0.01-5 parts by weight, based on 100 parts by weight of the water-soluble polymer.

The aqueous solution of the water-soluble polymer may be coated on the titanium oxide layer by the coating technique employed in step (i), and heated to a temperature preferably not higher than 100° C. for preferably 5 minutes or less to evaporate water. It is preferred to optimize the thickness of the water-soluble polymer layer depending on the exposure conditions. The thickness of the water-soluble polymer layer is commonly controlled to several micrometers.

The water-soluble polymer layer may be washed away when a latent pattern acting as a nucleus for crystal growth formed by UV irradiation in subsequent sub-step (b) is treated with a metal salt solution in subsequent sub-step (c). On the other hand, to prevent the metal salt solution used in sub-step (c) from being contaminated with the water-soluble polymer, the latent pattern acting as a nucleus for crystal growth formed in sub-step (b) may be washed with water to artificially remove the water-soluble polymer layer. As a result, the water-soluble polymer layer may completely disappear in the final black matrix prepared by a method of embodiments of the present invention.

In sub-step (b), the water-soluble polymer layer (not shown) may be selectively exposed to light to form a latent pattern acting as a nucleus for crystal growth ((C) of FIG. 2). Specifically, the water-soluble polymer layer formed in sub-step (a) may be selectively exposed to UV light through a photomask 4 to form a latent pattern acting as a nucleus for crystal growth consisting of active and inactive portions (the exposed portions are denoted by dashed lines in (C), (D) and (E) of FIG. 2)

In this step, exposure atmospheres and exposure doses are not especially limited, and may be properly selected according to the kind of photocatalytic compounds used. The activated photocatalytic pattern formed in this step acts as a nucleus for metal crystal growth in the subsequent plating step.

In sub-step (c), the latent pattern formed in sub-step (b) may be treated with a metal salt solution to form a metal particle-deposited pattern (not shown) thereon. Example of the metal salt solution used in the treatment include, but are not limited to, a silver (Ag) salt solution, a palladium (Pd) salt solution or a mixed solution thereof can be used. The metal particle-deposited pattern formed on the latent pattern may exhibit sufficient activity as a catalyst to grow a Ni electroless plating layer 31 in the subsequent sub-step, such that crystal growth may be accelerated and thus a more densely packed Ni electroless plating layer 31 may be formed.

In step (iii), a Ni electroless plating layer 31 is formed on the metal particle-deposited pattern ((D) of FIG. 2). Ni electroless plating of the metal particle-deposited pattern may enable growth of a Ni metal crystal on the patterned nucleus for crystal growth to form a metal pattern. At this time, the Ni metal pattern preferably has a thickness of 0.3 µm or less because of small step height in the subsequent processing and advantages in quality improvement.

The electroless Ni plating may be performed by dipping the substrate on which the pattern acting as a nucleus for crystal growth is formed in a plating solution containing (i)

a nickel salt, (ii) a reducing agent, (iii) a complexing agent, (iv) a pH-adjusting agent, (v) a pH buffer, and (vi) a modifier. For improved electrical properties and adhesion, baking may be conducted.

The nickel salt used in the plating solution may serve as a source providing nickel ions to the substrate. Examples of the nickel salt include, but are not limited to, nickel chlorides, nickel sulfates, and nickel acetates. Nickel chlorides are preferred.

The reducing agent used in the plating solution may act to reduce metal ions present on the substrate. Examples of the reducing agent include, but are not limited to, $NaBH_4$, $KBH_4$, $NaH_2PO_2$, hydrazine, formalin, and polysaccharides (e.g., glucose). $NaH_2PO_2$ is preferred.

The complexing agent used in the plating solution may function to prevent the precipitation of hydroxides in an alkaline solution and to control the concentration of free metal ions, thereby preventing the decomposition of metal salts and adjusting the plating speed. Examples of the complexing agent include, but are not limited to, ammonia solution, acetic acid, guanylic acid, tartaric acid salt, chelating agents (e.g., EDTA), and organic amine compounds. Chelating agents (e.g., EDTA) are preferred.

The pH-adjusting agent used in the plating solution may serve to adjust the pH of the plating solution, and May be an acidic or basic compound. The pH buffer used in the plating solution may inhibit sudden changes in the pH of the plating solution, and may be selected from organic acids and weakly acidic inorganic compounds. The modifying agent used in the plating solution may be a compound capable of improving coating and planarization characteristics. Examples of the modifying agent include, but are not limited to, common surfactants and adsorptive substances capable of adsorbing components interfering with the crystal growth.

In step (iv), a Ni/Pd alloy layer 32 is formed on the Ni electroless plating layer 31 ((E) of FIG. 2). The resulting structure of step (iii) may be dipped in the same Pd metal salt solution as that used in sub-step (c) of step (ii). The substrate on which the Ni electroless plating layer is formed after step (iii) may be dipped in the Pd metal salt solution to form a Ni/Pd alloy layer 32, which is formed by substitution between Ni constituting the Ni electroless plating layer and Pd present in the Pd metal salt solution. The treatment with the Pd metal salt solution is preferably performed for 1-20 minutes. When the treatment is performed for less than one minute, the substitution between Pd and Ni may be insufficient. Meanwhile, when the treatment is performed for more than 20 minutes, an excess of Pd may be deposited on the substrate, making the substrate thicker than necessary. On the other hand, the temperature of the Pd metal salt solution is preferably between room temperature and 40° C. in which the substitution between Ni and Pd is activated.

Further, in view of low reflectance of the black matrix according to embodiments of the present invention, the content of Pd in the Ni/Pd alloy layer 32 is preferably limited to 5-80 wt %, and more preferably 10-50 wt %.

After formation of the Ni/Pd alloy layer 32, electro or electroless plating of a highly conductive metal, for example, Cu, Ni, Ag or Au, may be performed to improve the electrical conductivity of the final black matrix.

The electroless or electroplating is achieved in accordance with well-known procedures.

Electroless plating may be performed by dipping the substrate on which the Ni/Pd alloy layer 32 is formed in a plating solution containing 1) a metal salt, e.g., Cu, Ni, Ag or Au salt, 2) a reducing agent, 3) a complexing agent, 4) a pH-adjusting agent, 5) a pH buffer, and 6) a modifier. The metal salt 1) serves as a source providing metal ions to the substrate. Examples of the metal salt include chlorides, nitrates, sulfates, and acetates of the metal.

Electro plating may be performed by dipping the substrate on which the Ni/Pd alloy layer 32 is formed in a plating solution containing 1) a metal salt, 2) a complexing agent, 3) a pH-adjusting agent, 4) a pH buffer, and 5) a modifier, followed by application of electricity.

To improve the electrical properties and adhesion of the plating layer 33 of a highly conductive metal, such as Cu, Ni, Ag or Au, baking may be conducted.

The front-surface reflection of the black matrix according to embodiments of the present invention may be controlled by controlling the thickness and refractive index of the respective layers. In doing so, the black matrix of embodiments of the present invention may be prepared without undergoing complicated processing, such as vacuum sputtering and photolithography. The optimum line width and pitch size of the black matrix according to embodiments of the present invention may be achieved by controlling the line width and pitch of the photomask used during exposure to UV light.

In conclusion, the black matrix of embodiments of the present invention may have a low front-surface reflectance, causing no problem in visibility, and has a high blackening density via selective multilayer plating only. Accordingly, the black matrix of embodiments of the present invention may be employed in the fabrication of flat panel displays. In addition, since the black matrix of embodiments of the present invention may exhibit superior electrical conductivity, it may be employed in the fabrication of electromagnetic interference filters without additional front-surface blackening.

Embodiments of the present invention will now be described in more detail with reference to the following examples. However, these examples are given for the illustration of the preferred embodiments of the present invention only, and are not to be construed as limiting the scope of the invention.

COMPARATIVE EXAMPLE 1

A solution of polybutyl titanate (5.0 wt %) in isopropanol was spin-coated at 2,000 rpm on a glass substrate, and was then dried on a hot plate at 100° C. for 5 minutes to form a photoreactive film. At this time, the photoreactive film was controlled to have a thickness of about 40 nm. A solution of 10 g of polyvinyl alcohol (molecular weight: ~6,000), 12 g of citric acid, 1.0 ml of triethanolamine and 15 ml of isopropyl alcohol in 200 ml of distilled water was spin-coated at 2,000 rpm on the photoreactive film to form a water-soluble polymer layer having a thickness of about 400 nm. A photomask on which a fine mesh pattern was formed was positioned on the water-soluble polymer layer, and was exposed to UV rays in a broad range of wavelengths. After exposure, the UV-exposed substrate was dipped in an aqueous Pd salt solution of 0.3 g of $PdCl_2$, 10 g of KCl and 10 ml of conc. hydrochloric acid in one liter of distilled water to deposit Pd metal particles on the surface of the exposed portions, thus forming a negative pattern acting as a nucleus for crystal growth consisting of Pd particles. Since the water-soluble polymer layer was formed from a mixture of the water-soluble polymer and the photosensitive compound, it was washed away when dipped in the aqueous Pd salt solution after UV exposure.

The negative pattern acting as a nucleus for crystal growth was subjected to Ni electroless plating in a Ni electroless plating solution having the composition indicated in Table 1 for one minute while the temperature of the plating solution was maintained at 50° C., and the Ni electroless plating layer thus formed was grown to a thickness of 1,300 nm. Thereafter, the Ni electroless plating layer was baked in a dry oven at 230° C. for 2 hours. The thickness, reflectance and absorbance of the substrate on which the metal pattern was formed were measured in accordance with the methods described below. The results are shown in Table 2.

EXAMPLE 1

The substrate on which the metal pattern was formed, prepared in Comparative Example 1, was dipped in an aqueous Pd salt solution (40° C.) of $PdCl_2$ (0.3 g), KCl (10 g) and conc. hydrochloric acid (10 ml) in one liter of distilled water for 4 minutes to form a Ni/Pd alloy layer. The resulting structure was baked in a dry oven at 230° C. for 2 hours.

The thickness, reflectance and absorbance of the substrate on which the metal pattern was formed were measured in accordance with the methods described below. The results are shown in Table 2.

COMPARATIVE EXAMPLE 2

A substrate on which a metal pattern was formed was prepared in the same manner as in Comparative Example 1, except that an aqueous Pd salt solution prepared by adding a solution (6 ml) of $PdCl_2$ (0.6 g) in conc. sulfuric acid (2 ml) and distilled water (1 liter) to a 20% $KNO_3$ solution (100 g) were used, instead of the aqueous Pd salt solution used in Comparative Example 1. The thickness, reflectance and absorbance of the resulting substrate were measured in accordance with the methods described below. The results are shown in Table 3.

EXAMPLE 2

The substrate on which the metal pattern was formed, prepared in Comparative Example 2, was dipped in an aqueous Pd salt solution (40° C.) prepared by adding a solution (6 ml) of $PdCl_2$ (0.6 g) in conc. sulfuric acid (2 ml) and distilled water (1 liter) to a 20% $KNO_3$ solution (100 g) for 4 minutes to form a NiPd alloy layer. The substrate on which the Ni/Pd alloy layer was formed was baked in a dry oven at 230° C. for 2 hours. The thickness, reflectance and absorbance of the substrate on which the metal pattern was formed were measured in accordance with the methods described below. The results are shown in Table 3.

EXAMPLE 3

A substrate on which a metal pattern was formed was prepared in the same manner as in Example 2, except that the metal pattern was dipped in the aqueous Pd salt solution for 8 minutes. The thickness, reflectance and absorbance of the resulting substrate were measured in accordance with the methods described below. The results are shown in Table 3.

<Evaluation Methods of Physical Properties>

(1) Measurement of Film Thickness

The film thickness was evaluated by measuring the step height of a surface profiler using alpha-step (manufactured by Dektak).

(2) Measurement of Reflectance

A reflection spectrum was obtained at 350-950 nm using LAMDA900, and then reflectance was measured at 550 nm.

(3) Measurement of Absorbance

A UV-Visible spectrum were obtained at 200-800 nm using Jasco=1 UV-Vis spectrophotometer V-560.

(4) Analysis of Composition of Ni/Pd Alloy Layers

The composition of Ni/Pd alloy layers was analyzed using an inductively coupled plasma-atomic emission spectrometer (ICP-AES).

TABLE 1

| Composition of Ni electroless plating solution | |
|---|---|
| Distilled water = | 1 liter |
| $NiCl_2 \cdot 6H_2O$ = | 10 g |
| $NaH_2PO_2 \cdot 2H_2O$ = | 30 g |
| $CH_3COONa$ = | 6 g |
| $NH_4Cl$ = | 40 g |

TABLE 2

| | Thickness (Å) | Reflectance (%) | Absorbance | Composition (%) of Ni/Pd alloy layer |
|---|---|---|---|---|
| Comparative Example 1 | 1,300 | 50 | 3.3 | — |
| Example 1 | 2,100 | 10 | 2.5 | Phosphorus (P): 21.1, Nickel (Ni): 55.8, Palladium (Pd): 23.1 |

TABLE 3

| | Thickness (Å) | Reflectance (%) | Absorbance |
|---|---|---|---|
| Comparative Example 2 | 774 | 64 | 1.54 |
| Example 2 | 800 | 35 | 0.85 |
| Example 3 | 1,000 | 11 | 0.76 |

As can be seen from the data shown in Tables 2 and 3, the reflectance and absorbance of the black matrices in which the Ni/Pd alloy layer was formed according to embodiments of the present invention are markedly decreased, compared to those of the black matrices in which no Ni/Pd alloy layer was formed on the Ni electroless plating layer.

As apparent from the above description, since the black matrix of embodiments of the present invention has a high blackening density via simple selective multilayer plating without using a high-price vacuum sputtering apparatus and undergoing photolithography, it may be used in various flat panel displays. In addition, since the black matrix of embodiments of the present invention exhibits superior electrical conductivity, it can be used in electromagnetic interference filters without additional front-surface blackening.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A black matrix comprising (i) a substrate, (ii) a titanium oxide layer, (iii) a Ni plating layer, and (iv) a Ni/Pd alloy layer.

2. The black matrix according to claim 1, further comprising an electro or electroless plating layer of at least one metal selected from the group consisting of Cu, Ni, Ag and Au.

3. The black matrix according to claim 1, wherein the titanium oxide layer is a $TiO_x$ layer (0<x<2).

4. The black matrix according to claim 1, wherein the Ni/Pd alloy layer contains Pd in an amount of 5-80 wt %.

5. An electromagnetic interference filter comprising the black matrix according to claim 1.

6. A flat panel display comprising the black matrix according to claim 1.

7. A method for preparing a black matrix, comprising the steps of:
(i) forming a titanium oxide layer on a substrate;
(ii) forming a metal particle-deposited pattern on the titanium oxide layer;
(iii) forming a Ni electroless plating layer on the metal particle-deposited pattern; and
(iv) forming a Ni/Pd alloy layer on the Ni electroless plating layer.

8. The method according to claim 7, wherein step (ii) includes the sub-steps of: (a) coating a water-soluble polymeric compound on the titanium oxide layer to form a water-soluble polymer layer; (b) selectively exposing the water-soluble polymer layer to light to form a latent pattern acting as a nucleus for crystal growth; and (c) treating the latent pattern with a metal salt solution to form the metal particle-deposited pattern.

9. The method according to claim 8, wherein the step of forming the water-soluble polymer layer comprises adding a photosensitizer to a water-soluble polymeric compound to form a mixture and coating the mixture.

10. The method according to claim 9, wherein the water-soluble polymeric compound is at least one polymer selected from the group consisting of polyvinylalcohols, polyvinylphenols, polyvinylpyrrolidones, polyacrylic acids, polyacrylamides, gelatins, and copolymers thereof.

11. The method according to claim 9, wherein the photosensitizer is at least one compound selected from the group consisting of colorants, organic acids, organic acid salts, and organic amines.

12. The method according to claim 9, wherein the photosensitizer is at least one compound selected from the group consisting of tar colorants, potassium and sodium salts of chlorophylline, riboflavin and derivatives thereof, water-soluble annatto, $CuSO_4$, caramel, curcumine, cochinal, citric acid, ammonium citrate, sodium citrate, oxalic acid, potassium tartarate, sodium tartarate, ascorbic acid, formic acid, triethanolamine, monoethanolamine, and malic acid.

13. The method according to claim 8, wherein the metal salt solution is a silver (Ag) salt solution, a palladium (Pd) salt solution, or a mixed solution thereof.

14. The method according to claim 7, further comprising the step of forming an electro or electroless plating layer of at least one metal selected from the group consisting of Cu, Ni, Ag and Au on the Ni/Pd alloy layer.

15. The method according to claim 7, wherein the step of forming the Ni/Pd alloy layer comprises dipping the resulting substrate after step (iii) in an aqueous Pd salt solution.

16. The method according to claim 7, wherein the titanium oxide layer is made of a Ti-containing organometallic compound.

17. The method according to claim 16, wherein the Ti-containing organometallic compound is at least one compound selected from the group consisting of tetraisopropyl titanate, tetra-n-butyl titanate, tetrakis(2-ethyl-hexyl) titanate, and polybutyl titanate.

* * * * *